US000001204H

United States Statutory Invention Registration [19]

[11] Reg. Number: H1204

Sungaila

[43] Published: Jul. 6, 1993

[54] ENVIRONMENTALLY SAFE FLUID EXTRACTOR

[75] Inventor: Zenon F. Sungaila, Orland Park, Ill.

[73] Assignee: The United States of America as represented by the United States Department of Energy, Washington, D.C.

[21] Appl. No.: 870,068

[22] Filed: Apr. 17, 1992

[51] Int. Cl.[5] ..... E03B 5/00

[52] U.S. Cl. ..... 137/565; 137/550

[58] Field of Search ..... 137/565, 550

[56] References Cited

U.S. PATENT DOCUMENTS

| | | | |
|---|---|---|---|
| 3,685,539 | 8/1972 | Warren | 137/565 |
| 3,788,349 | 1/1974 | Meyer et al. | 137/565 |
| 4,111,715 | 9/1978 | Sprengling et al. | 137/565 |
| 4,231,768 | 11/1980 | Seibert et al. | 55/275 |
| 4,646,784 | 3/1987 | de Leeuve | 137/565 |
| 4,749,671 | 6/1988 | Saito et al. | 502/64 |

*Primary Examiner*—Harold J. Tudor

*Attorney, Agent, or Firm*—Tyrone Davis; Robert J. Fisher; William R. Moser

[57] ABSTRACT

An environmentally safe fluid extraction device for use in mobile laboratory and industrial settings comprising a pump, compressor, valving system, waste recovery tank, fluid tank, and a exhaust filtering system.

10 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ENVIRONMENTALLY SAFE FLUID EXTRACTOR

CONTRACTUAL ORIGIN OF THE INVENTION

The U.S. Government has rights in this invention pursuant to Contract No. W-31-109-ENG-38 between the United States Department of Energy and Argonne National Laboratory.

BACKGROUND OF THE INVENTION

This invention relates to a fluid extracting and replenishing device having the ability to extract harmful contaminates and introduce a replenishing fluid into a motor pump, or cylinder with a limited exposure of the contaminates to the atmosphere.

Prior to the development of the subject invention the filling and extraction of fluids in laboratory applications was done by using some gravity assisted methods. It usually required that the handler be exposed to harmful contaminates and resulted in some spillage and creation of additional contaminates involved in the clean up. For example, in extracting used oil from a standard laboratory vacuum pump, a drain screw is normally removed and an open container is placed underneath to catch the waste oil. In this application the likelihood of spillage is increased when the screw is removed and harmful off-gases of the contaminated oil are allowed to escape into the atmosphere. In the instant invention the environmentally safe fluid extractor is a mobile energy efficient means of extracting or filling hazardous fluids. It combines the effectiveness of a vacuum to extract fluids with the ease of a compressor to refill a container using a single diaphragm or bellows pump with an intricate piping arrangement allowing the pump to complete both tasks.

SUMMARY OF THE INVENTION

This invention relates to a fluid extraction device for removing or replenishing fluids from industrial machinery, containers, marine or ordinary automotive engines. The environmentally safe fluid extractor is characterized by a closed system which may be either evacuated or pressurized to extract or replenish fluid containers. It is a mobile, self contained unit which requires minimal amounts of energy to perform either task.

It allows for the complete extraction and replenishment of fluids in an environmentally safe manner by a significant reduction in the amount of spillage allowed and the contact of harmful off-gasses with the atmosphere.

The invention uses a closed system including a container forming a vacuum or pressure chamber, piping is connected to a pump which includes an intricate valve system by which the chamber is evacuated or pressurized. A fluid flow tube directs the fluid into or out of the chamber without interference with the vacuum or pressure systems. At least one filter is connected to the vacuum exhaust system to remove any harmful gasses or particulate matter in the exhaust gasses. Operation of the fluid extractor is simple and confines the waste fluid within the closed system until an environmentally safe disposal of the substance is possible. The gas is introduced in the manifold and pumped into the sample container. In addition, quick sampling can be accomplished using the device and a handheld cylinder. The cylinder is evacuated using the extractor. The cylinder is connected to the container and the sample is retrieved using the vacuum-like conditions of the cylinder to draw the fluid into the cylinder. The cylinder is then reconnected to the device and the sample is removed by pressurization of the cylinder. If necessary, an inert gas may be used to cover the sample in the sampling cylinder.

It is an object of this invention to provide an environmentally safe method of waste fluid retrieval from industrial equipment.

It is also an object of this invention to provide an environmentally safe means to extract and replenish contaminated fluids using a minimum amount of energy to complete the task.

An additional object of the invention is to provide an inexpensive, mobile means to extract contaminated fluids with a minimal amount of spillage.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the invention may comprise a pump, compressor, valving system, waste recovery tank, fluid tank, and an exhaust filtering system.

BRIEF DESCRIPTION OF THE DRAWINGS

The accompanying drawings, which are incorporated in and form part of the specification, illustrate an embodiment of the present invention and together with the description, serve to explain the principles of the invention. In the drawings.

DETAILED DESCRIPTION OF THE INVENTION

Figure 1:
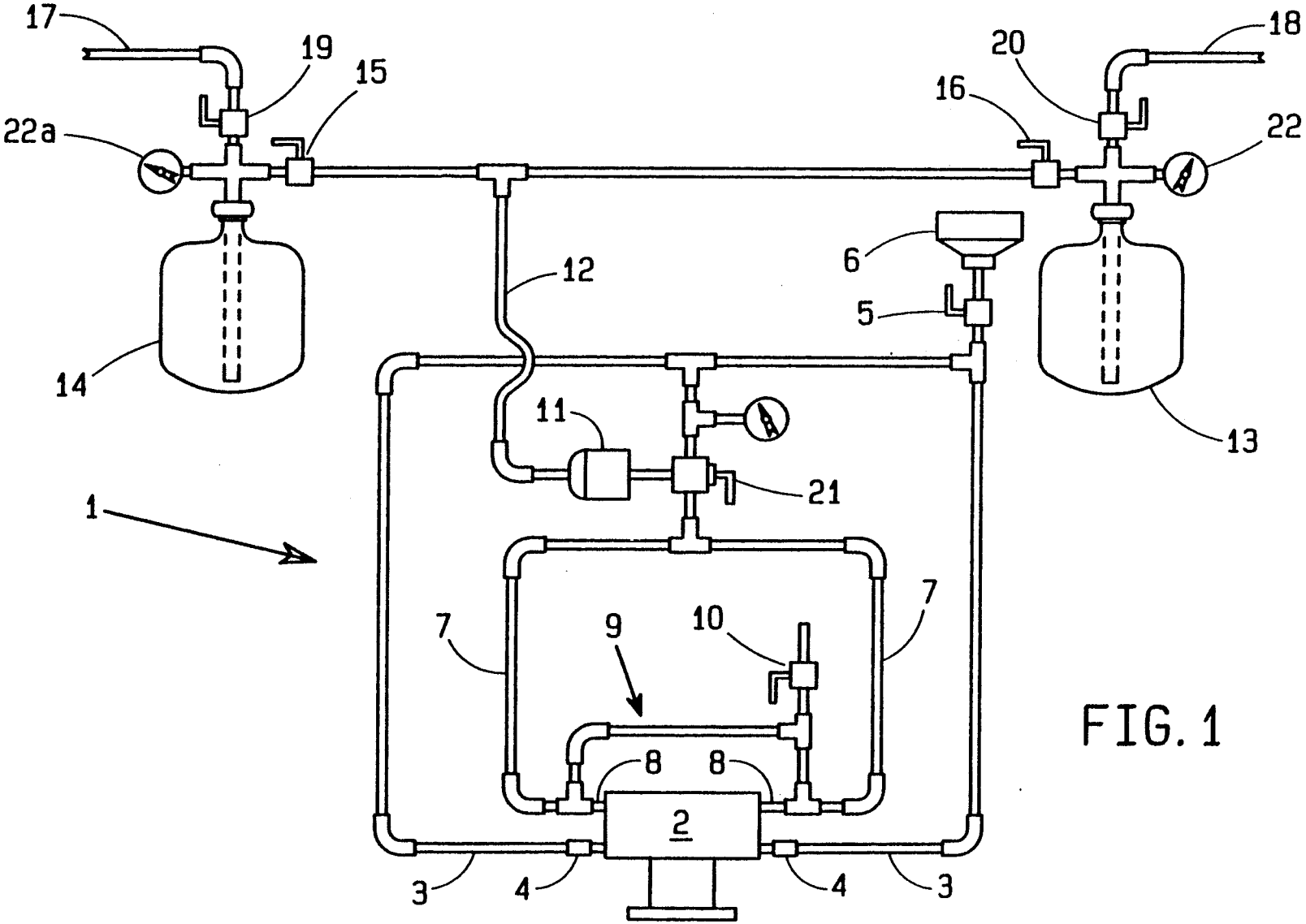
FIG. 1 shows a piping diagram of an embodiment of the invention with a manual valving system.

Referring to FIG. 1, the environmentally safe fluid extractor 1 includes a bellows or diaphragm pump 2. Piping 3 is connected to the pumps outlets 4, which is directed to a valve 5 and final exhaust filter 6. The exhaust filter 6 is of the cellulose type which has the ability to remove particulate matter from exhaust gasses prior to its release into the atmosphere. Piping 7 is connected to the intake inlets 8 of the pump 2. A special piping arrangement 9 is connected to the inlet piping 7 to allow evacuation of sample cylinders. A standard valve 10 is connected to piping 9 that allows quick connection of filters and sample cylinders. A molecular sieve trap filter 11 connected to the inlet piping 7 absorbs any potential contaminates to the pump 2. Piping 12 leading from the molecular sieve trap 11, connects to the waste tank 13 and replenishment tank 14. Each tank 13 and 14 has a series of valves 15 and 16 that allows each tank to be either evacuated or pressurized. Flexible piping 17 and 18 is connected to tanks 13 and 14 allowing it to be inserted into a container so that the fluids may either be extracted or replenished.

In operation, to extract fluids from a container valves 20 and 15 are closed, and valve 16 is opened. The pump 2 is started and the three-way valve 21 is set to evacuate the waste tank 13. Once the gage 22 shows 25 inches mercury vacuum in the tank 13, then valve 16 is closed and pump 2 is stopped. The flexible piping 18 is inserted into the container and valve 20 is opened and the fluid is extracted by the negative pressure in the waste tank 13. In replenishing the container, valve 15 is opened and valve 19 is closed. Valve 21 is set to pressurize replenishment tank 14 and the pump 2 is started. When the gage 22 shows that the replenishment tank 14 is sufficiently pressurized valve 15 is closed and pump 2 is stopped. The flexible piping 17 is inserted into the container and valve 19 is opened allowing the replenishment fluid to flow into the container.

Figure 2:
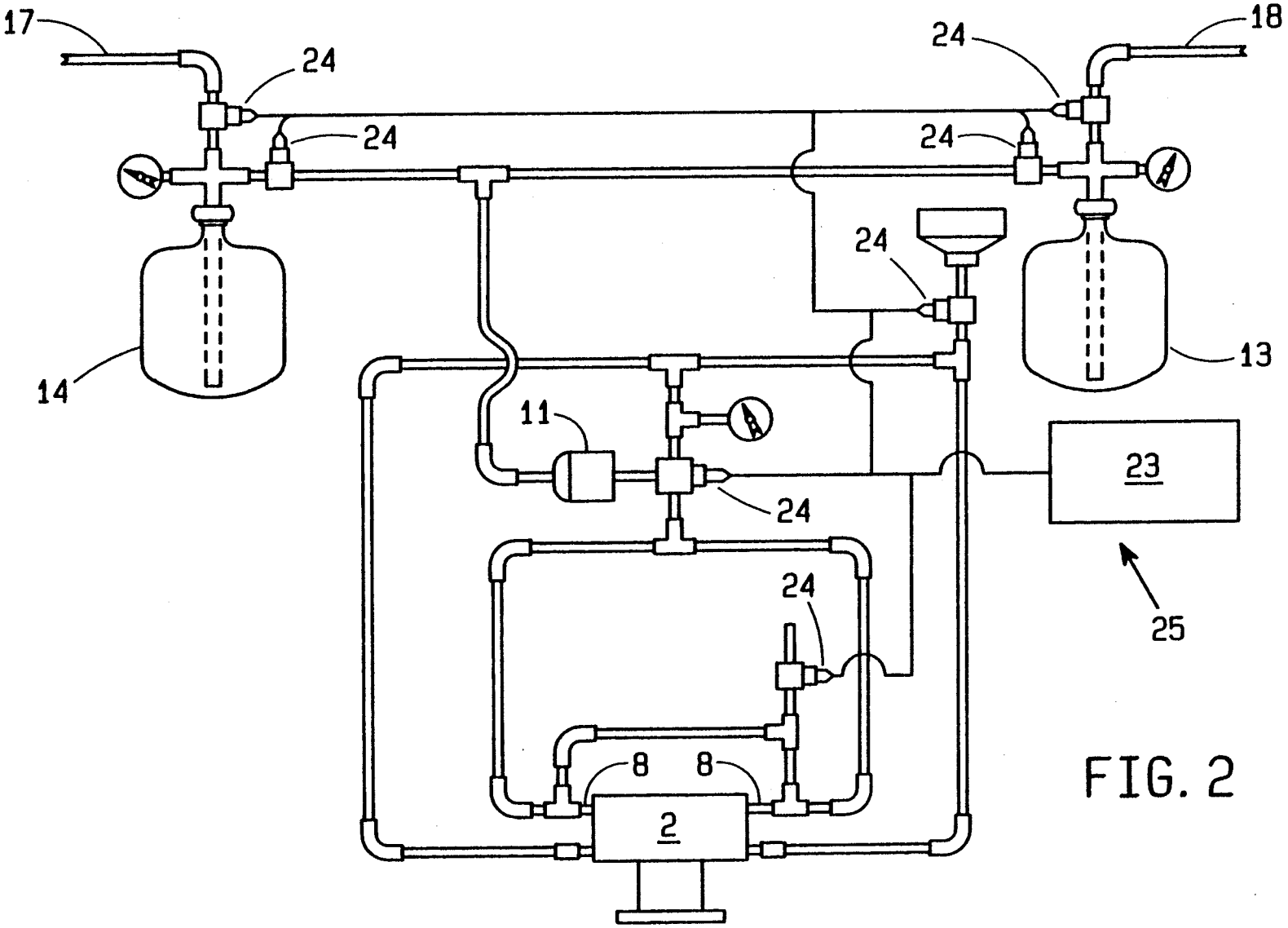
FIG. 2 shows a piping diagram of another embodiment of the invention with an electronic valving system.
Figure 3:
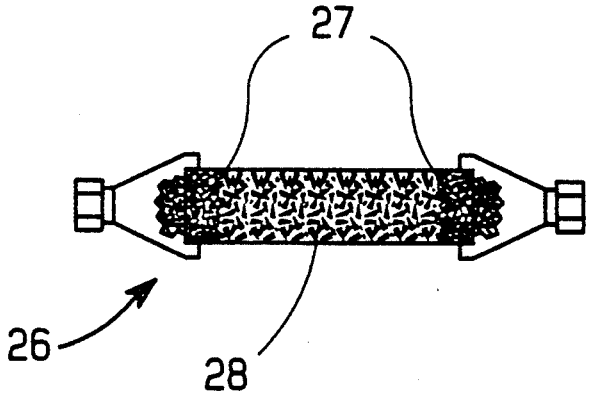
FIG. 3 shows a section of the molecular sieve trap filtering system.

FIG. 2 shows an embodiment of the invention having an electronic valving system 25 controlled by a microprocessor 23. In operation, evacuation or pressurization is selected on the microprocessor 23. The tank selection is entered either replenishment 13 or waste 14. The pump 2 is started and the appropriate valves are either opened or shut by solenoids 24 to correspond with the selections entered into the microprocessor 23. After manual insertion of flexible piping 17 or 18 into the container the container is either replenished or waste fluids extracted. In each operation contamination of the pump 2 is a major concern therefore, the introduction of the molecular sieve trap 11 to the inlet line 8 reduces the likelihood of that occurrence. As shown in FIG. 3, the molecular sieve trap 26 consists of copper wool fibers 27 on the ends of trap large particulate matter, while zeolite crystals 28 are tightly packed inside to trap and absorb contaminated fluids before they reach the pump inlets. In the event that harmful vapor might travel through the pump the cellulose filter 11 traps and allows only pure exhaust gasses to be emitted.

The foregoing description of the preferred embodiment of the invention has been presented for purposes of illustration and description. It is not intended to be exhaustive or to limit the invention to the precise form disclosed, and obviously many modifications and variations are possible in light of the above teaching.

The embodiments of the invention in which an exclusive property or privilege is claimed are defined as follows:

1. A fluid extracting system comprising:

means for evacuation of fluids from a container and said means for evacuation having the ability to pressurize said container, and including means for filtering gasses and particulate matter;

a waste container connected to said means for evacuation of fluids and adapted to receive said evacuated fluids from said container;

a replenishing tank connected to said means for evacuation;

a sampling system connected to said means for evacuation; and a valving system adapted to allow a fluid to flow from said container to said waste container, and said replenishment tank.

2. A fluid extraction system as recited in claim 1, wherein said means for evacuation comprises:

a flexible piping system which connects said container to said means for evacuation and allows said waste container to receive said evacuated fluids through said valving system.

3. A fluid extracting system as recited in claim 2, wherein said valving system is adapted to allow said means for evacuation to evacuate said waste container and pressurize said replenishment tank.

4. A fluid extracting system as recited in claim 3, wherein said means for filtering comprises:

a molecular sieve trap, said molecular sieve trap comprising copper wool, and zeolite; and a cellulose filter.

5. A fluid extracting system as recited in claim 4, wherein said valving system comprises:

means for shut-off attached to said piping system having the ability to open and shut-off said flexible piping system to allow the evacuation and pressurization of said waste container and replenishment tank.

6. A fluid extracting system as recited in claim 5, wherein said means for evacuation includes a bellows pump.

7. A fluid extracting system as recited in claim 5, wherein said means for evacuation includes a diaphragm pump.

8. A fluid extracting system as recited in claims 6 or 7, wherein said means for evacuation is adapted so that said molecular sieve trap is positioned to absorb harmful off-gasses and large particulate matter, thereby reducing the risk of contamination of said means for evacuation.

9. A fluid extracting system as recited in claim 8, wherein said cellulose filter is positioned to trap particulate matter expelled in the exhaust gasses from said means for evacuation.

10. A fluid extracting system as recited in claim 9, wherein said sampling system comprises:

an air-tight cylinder adapted to retain its integrity during evacuation;

means for closure connected to said air-tight cylinder and adapted to allow fluids to be evacuated from said air-tight cylinder.

* * * * *